United States Patent [19]

Kaufman et al.

[11] Patent Number: 4,626,220

[45] Date of Patent: Dec. 2, 1986

[54] PSYCHOLOGICAL TEST DEVICE

[75] Inventors: Alan S. Kaufman; Nadeen L. Kaufman, both of San Diego, Calif.; Jack A. Naglieri, Powell, Ohio

[73] Assignee: American Guidance Service, Inc., Circle Pines, Minn.

[21] Appl. No.: 593,820

[22] Filed: Mar. 27, 1984

[51] Int. Cl.$^4$ ............................................. G09B 1/22
[52] U.S. Cl. ................................. 434/236; 434/404
[58] Field of Search ............... 434/236, 404, 174, 198

[56] References Cited

U.S. PATENT DOCUMENTS 2,810,211 10/1957 Zesbaugh .......................... 434/174
2,959,872 11/1960 Rodgers ............................ 434/404
2,965,980 12/1960 Day .................................. 434/198

*Primary Examiner*—William H. Grieb
*Attorney, Agent, or Firm*—Burd, Bartz & Gutenkauf

[57] ABSTRACT

A psychological test device for measuring the intellectual ability of children by identification of a picture which the examiner exposes in sequential small increments by slowly moving it behind a narrow window. The device comprises a rotatable circular disk interposed between front and back face plates. The front of the disk carries a plurality of pictorial elements. The back face of the disk carries corresponding identifying indicia. A narrow window in the front face plate overlies the path of rotary movement of the pictorial information. A cut-out in one edge of the face plates, coupled with finger notches in the exposed peripheral edge of the disk, permits easy rotation of the disk. A timing scale assists the examiner in regulating the exposure time of each pictorial element being tested.

13 Claims, 4 Drawing Figures

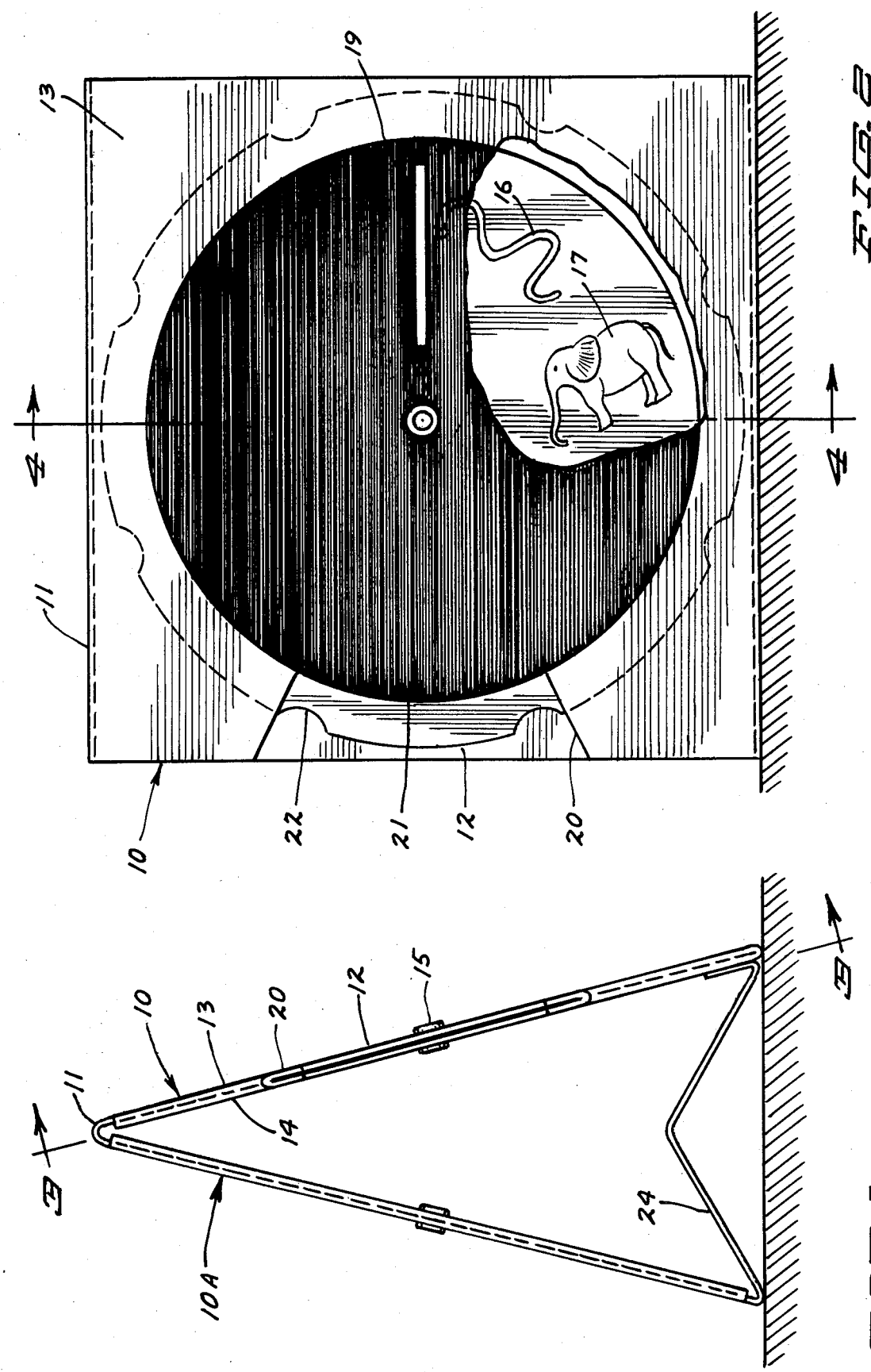

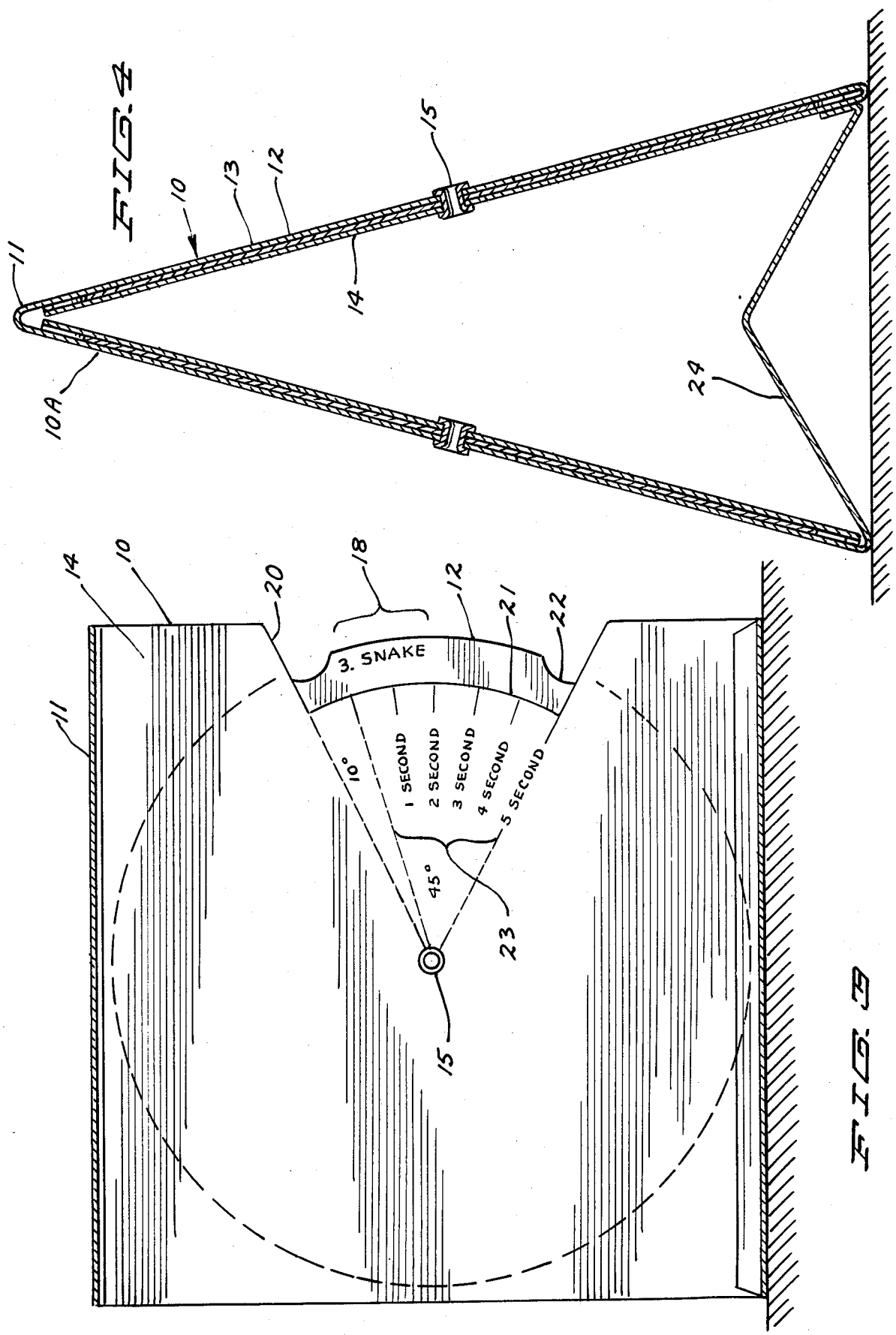

4,626,220

PSYCHOLOGICAL TEST DEVICE

FIELD OF THE INVENTION

BACKGROUND OF THE INVENTION

This invention is directed to a test device for measuring the intellectual ability of children. The device is intended primarily for use with children in the range from about two to twelve years. The device is intended for an individually administered test assessing the ability of a child to identify a picture which the examiner exposes by slowly moving it behind a narrow window such that the picture is only partially visible at any one time.

SUMMARY OF THE INVENTION

Broadly stated, the psychological test device according to the present invention comprises a circular disk interposed between front and back face plates and mounted for rotation relative to the face plates. The face plates are generally rectangular. They are of a size larger than the circular disk and are fixed together along at least one edge in a flat compact assembly. The outside face of the circular disk contains a plurality of elements of pictorial information uniformly arrayed around the disk and spaced inward from its periphery. The back, or inside, face of the disk has a corresponding plurality of elements of descriptive identifying information uniformly arrayed around the periphery of the disk.

The front face plate has a window overlying the path of rotary movement of the pictorial information on the disk. The area of this window is small relative to the size of the element of pictorial information so that only small successive increments of the pictorial information are exposed through the window at any one time. A common cut-out in one edge of the face plates exposes the edge of the circular disk for manual rotation and viewing of the identifying information on the back face of the disk. Thus, the depth of the cut-out is sufficient to expose a narrow marginal edge of the disk without exposing any of the pictorial information on its front face. The width of the cut-out is correlated to the number of elements of information on the disk such that rotation of the disk through the area of the cut-out exposes one element of pictorial information to the subject being tested.

A timing scale is preferably disposed on the back face plate adjacent to the inner edge of the cut-out. This timing scale is correlated to the descriptive identifying information on the disk and assists the person administering the test in regulating the exposure time of each pictorial element to the child being tested.

In its preferred form, the window is a narrow radial slot. Two test devices are desirably combined into a dual face easel-like unit hinged along its top edge. Finger notches are desirably provided in the peripheral edge of the circular disk to facilitate rotation of the disk, location of the disk relative to individual test events, and to facilitate timing.

BRIEF DESCRIPTION OF THE DRAWINGS

The invention is illustrated by the accompanying drawings in which corresponding parts are identified by the same numerals and in which:

FIG. 1 is a side elevation of the preferred form of dual face easel-type test device according to the present invention;

FIG. 2 is an elevation of one front face of the test device with a portion of the front face plate broken away to show the underlying rotatable disk;

FIG. 3 is a section on the line 3—3 of FIG. 1 and in the direction of the arrows showing the back face plate of one of the devices; and FIG. 4 is a section on the line 4—4 of FIG. 2 and in the direction of the arrows showing the assembly of disk and face plates.

DETAILED DESCRIPTION OF THE PREFERRED EMBODIMENT

Referring now to the drawings, there is shown the preferred form of the present invention in which two identical individual test devices, indicated generally at 10 and 10A, are joined together along their top edges in a flexible hinge 11. Each individual device 10 and 10A comprises a thin flat circular disk 12 interposed between thin flat front and back face plates 13 and 14, respectively. The disk 12 is rotatively mounted between the face plates, as by means of a rivet or grommet 15.

The front face of disk 12 has a plurality of elements of pictorial information, here shown as snake 16 and elephant 17, uniformly arrayed around the disk and spaced inwardly from its periphery. Other exemplary elements of pictorial information include a tree, an apple, a pair of scissors, a boat, an automobile, etc., all being pictures of objects familiar to a child of the age being tested. In a typical test device, eight such pictures might be displayed on a single disk. The pictures on the disk of the device 10A, of course, are different from those on the disk of device 10. A corresponding plurality of elements of descriptive identifying information 18, here shown as the name and an identifying number, is displayed on the peripheral edge of the back face of disk 12.

A window 19, here shown in the form of a narrow radial slot, is cut in the front face plate 13 overlying the rotational path of the pictorial information on the disk as the disk is rotated. As seen in FIG. 2, the area of window 19 is small relative to the size of the underlying pictorial element such that, as the disk is turned, small increments of the pictorial information are sequentially exposed through the window. The identifying indicia 18 is correlated to the pictorial information such that the person administering the test can identify the pictorial information as it is exposed through the window, which is not within his view. Thus, as shown, the identifying information for each element of pictorial information is on the opposite side of the disk and on the diametrically opposite edge of the disk.

A common cut-out area 20 is provided in one edge of the front and rear face plates. The depth of the cut-out 20 is sufficient to expose a narrow marginal edge of the front face of disk 12 without exposing any of the pictorial information. The bottom edge 21 of cut-out 20 is preferably arcuate, as shown. The exposed marginal edge of disk 12 is provided with a plurality of finger notches 22, preferably arcuate, as shown. The finger notches 22 primarily facilitate rotation of disk 12, but also perform spacing and timing functions, as hereinafter more fully described. The finger notches 22 correspond in number to the elements of pictorial information on the disk.

The width of cut-out 20 is correlated to the number of elements of pictorial information. In its preferred form, as illustrated, the side edges of the cut-out are defined by extensions of radial lines from the axis of the disk, as best seen in FIG. 3. The angular relationship of those radial lines is a minimum angle equal to 360° divided by the number of elements of pictorial information. In the exemplary illustration, in which the disk carries eight elements of pictorial information, the minimum angle of the lines defining cut-out 20 is 45°. Preferably, however, as shown, the angular relationship of the lines defining the cut-out is 360° divided by the number of elements of pictorial information, plus the angle of a segment defined by radial lines extending to the edges of a finger notch 22, here shown as approximately 10°.

Thus, the pictorial information, the identifying indicia, the finger notches, and the cut-out, are all correlated so that when the disk is located with two adjacent finger notches within the cut-out, the disk is in a "start" position. The window 19 is blank. The indicia identifying the next element of pictorial information to come into view within the window is visible on the back face of the disk. If the person administering the test inserts his finger in the uppermost finger notch and rotates the disk clockwise from his vantage point by moving the finger notch downwardly until the finger comes to rest on the bottommost edge of the cut-out, the disk will have been moved through one cycle. The child being tested facing the window will see the disk moving counter-clockwise from his vantage point and will see successive increments of the pictorial information exposed in sequence.

As seen in FIG. 3, the back face 14 of the device 10 preferably includes a timing scale 23. The timing scale is adjacent to the bottom edge 21 of the face plate cut-out. The scale is on the outer periphery of a segment defined by extensions of radial lines from the axis of rotation of the disk, the angular relationship of the lines being 360° divided by the number of elements of pictorial information on the disk. The timing scale is graduated in time segments, here 5 seconds, which together represent the time period during which the disk may be slowly rotated to pass all of one element of pictorial information past the window 19.

When the testing device is in use, the child being tested sits facing the easel-like device resting on a desk or table. The person administering the test sits opposite the child on the opposite side of the device. The disk is rotated slowly, exposing sequential increments of one element of pictorial information. As soon as the child recognizes the subject of the pictorial information, he signals this fact. From a series of these test events, a measure may be made which in turn contributes to the total assessment of the intellectual functioning of the child being tested. When the child has been tested with all of the pictorial subjects on one disk, the easel is reversed and the process is repeated as to the different pictorial objects on the disk of the companion testing device.

The testing device is formed from stiff paperboard or cardboard or opaque synthetic resinous plastic sheet material capable of being imprinted with the necessary pictorial information and other indicia, or equivalent material. In order to maintain the dual face device in upright easel-like position, a collapsible web 24 connects the respective test devices 10 and 10A, while at the same time permitting the dual device to be folded flat for carrying and storage. In this instance, web 24 is composed of a folded sheet of the same material from which the overall devices are formed connected to the bottom edges of the pair of test devices.

It is apparent that many modifications and variations of this invention as hereinbefore set forth may be made without departing from the spirit and scope thereof. The specific embodiments described are given by way of example only and the invention is limited only by the terms of appended claims.

The embodiments of the invention in which an exclusive property or privilege is claimed are defined as follows:

1. A psychological test device for measuring the intellectual ability of children which comprises:
   (A) a circular disk interposed between front and back face plates and mounted for rotation relative thereto,
   (B) said face plates being generally rectangular, fixed together along at least one edge, and of a size larger than the disk,
   (C) a plurality of elements of pictorial information on the front face of the disk uniformly arrayed spaced inwardly from the periphery of the disk,
   (D) a corresponding plurality of elements of descriptive identifying information on the back face of the disk uniformly arrayed around the periphery of the disk,
   (E) a window in the front face plate overlying the path of rotary movement of the pictorial information, the area of the window being small relative to the element of pictorial information such that only small increments of pictorial information are exposed through the window at any one time, and
   (F) a common cut-out in one edge of said face plates, the depth of said cut-out being sufficient to expose a narrow marginal edge of the front face of the disk without exposing the pictorial information, the width of said cut-out being correlated to the number of elements of pictorial information on the disk.

2. A psychological test device according to claim 1 wherein said window is in the form of a radial slot.

3. A psychological test device according to claim 1 wherein said disk has a plurality of uniformly spaced finger notches in its periphery, said notches corresponding in number to the elements of pictorial information.

4. A psychological test device according to claim 3 wherein the wide edges of said cut-out are defined by extensions of radial lines from the axis of rotation of the disk through the outermost edges of two adjacent finger notches.

5. A psychological test device according to claim 1 wherein:
   (A) said cut-out is in one vertical edge of the face plates,
   (B) said window in the front face plate is disposed spaced inwardly from the opposite vertical edge,
   (C) the identifying information on the back face of the disk is on the diametrically opposite edge of the disk from the pictorial information.

6. A psychological test device according to claim 5 wherein said window is in the form of a narrow radial slot.

7. A psychological test device according to claim 5 wherein:
   (A) the side edges of said cut-out are defined by extensions of radial lines from the axis of rotation of the disk, and
   (B) the angular relationship of said lines is at least 360° C. divided by the number of elements of pictorial information on the disk.

8. A psychological test device according to claim 5 wherein:

(A) said disk has a plurality of uniformly spaced arcuate finger notches in its perimeter, said notches corresponding in number to the elements of pictorial information,
(B) the side edges of said cut-out are defined by extensions of radial lines from the axis of rotation of the disk, and
(C) the angular relationship of said lines is 360° divided by the number of elements of pictorial information on the disk, plus the angle of a segment defined by radial lines extending to the edges of a finger notch.

9. A psychological test device according to claim 1 wherein a timing scale is provided on the back face plate adjacent to the inner edge of said cut-out, said timing scale being correlated to the descriptive identifying information on the disk.

10. A psychological test device according to claim 9 wherein:

(A) said timing scale comprises a segment adjacent the inner edge of the face plate cut-out defined by radial lines extending from the axis of rotation of the disk,
(B) the angular relationship of said lines is 360° divided by the number of elements of pictorial information on the disk, and
(C) said timing scale segment is divided into a plurality of equal time periods.

11. A psychological test device according to claim 10 wherein said timing scale is divided into five one second intervals.

12. A dual face psychological test device comprising a pair of test devices according to claim 1, said pair of devices being hingedly joined together along their top edges.

13. A dual face psychological test device according to claim 12 wherein the bottom edges of said pair of devices are joined together by a collapsible web limiting separation of those edges.

* * * * *

UNITED STATES PATENT AND TRADEMARK OFFICE
CERTIFICATE OF CORRECTION

PATENT NO. : 4,626,220

DATED : December 2, 1986

INVENTOR(S) : Alan S. Kaufman et al

It is certified that error appears in the above-identified patent and that said Letters Patent is hereby corrected as shown below:

Column 4, claim 7, line 7, "360° C." should be --360°--.

Signed and Sealed this

Twenty-first Day of April, 1987

*Attest:*

DONALD J. QUIGG

*Attesting Officer*  *Commissioner of Patents and Trademarks*